(12) United States Patent
Bauer et al.

(10) Patent No.: US 10,671,037 B2
(45) Date of Patent: Jun. 2, 2020

(54) MACHINE MAINTENANCE USING A MACHINE CONTROLLER AND A SERVICE COMPUTER

(71) Applicant: TRUMPF Werkzeugmaschinen GmbH + Co. KG, Ditzingen (DE)

(72) Inventors: Klaus Bauer, Ditzingen (DE); Hans-Peter Bock, Tamm (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 155 days.

(21) Appl. No.: 14/803,403

(22) Filed: Jul. 20, 2015

(65) Prior Publication Data

US 2015/0323920 A1 Nov. 12, 2015

Related U.S. Application Data

(63) Continuation of application No. PCT/EP2014/000099, filed on Jan. 16, 2014.

(30) Foreign Application Priority Data

Jan. 18, 2013 (DE) .................. 10 2013 200 798

(51) Int. Cl.
*G05B 19/04* (2006.01)
*G05B 19/042* (2006.01)
*G06K 7/10* (2006.01)

(52) U.S. Cl.
CPC ..... *G05B 19/0423* (2013.01); *G06K 7/10366* (2013.01)

(58) Field of Classification Search
CPC .................................. G05B 19/0423
See application file for complete search history.

(56) References Cited

U.S. PATENT DOCUMENTS 8,248,237 B2 8/2012 Fitzgerald et al.
2002/0049775 A1 4/2002 Friedrich et al.
(Continued)

FOREIGN PATENT DOCUMENTS

DE 102010013885 A1 10/2011
DE 102011053884 A1 3/2012
(Continued)

OTHER PUBLICATIONS

International Search Report for corresponding PCT Application No. PCT/EP2014/000099, dated Apr. 7, 2014, 5 pages.
(Continued)

*Primary Examiner* — Santosh R Poudel
(74) *Attorney, Agent, or Firm* — Fish & Richardson P.C.

(57) ABSTRACT

A machine controller for controlling a machine includes a data memory configured to store maintenance data for at least one of the machine controller or the machine in an electronically processable manner, an imaging processing unit configured to at least partially read the maintenance data from the data memory and to generate image information relating to a graphical representation that includes a first representation area representing a first section of the maintenance data in a form designed for machine readability. The machine controller includes at least one of: a display unit configured to display the graphical representation based on the image information or a data transmission interface configured to transmit the image information indirectly or directly to a service computer to display or evaluate the graphical representation on the service computer.

23 Claims, 5 Drawing Sheets

(56) References Cited

U.S. PATENT DOCUMENTS

| | | | |
|---|---|---|---|
| 2006/0106508 A1* | 5/2006 | Liebl | G07C 5/008 |
| | | | 701/31.4 |
| 2008/0091794 A1 | 4/2008 | Thieringer | |
| 2008/0172441 A1* | 7/2008 | Speicher | H04L 12/2838 |
| | | | 709/201 |
| 2009/0138106 A1 | 5/2009 | Komatsu et al. | |
| 2009/0326966 A1* | 12/2009 | Callaghan | G06Q 30/02 |
| | | | 705/1.1 |
| 2010/0162127 A1* | 6/2010 | Uchino | G06F 3/1454 |
| | | | 715/740 |
| 2012/0078896 A1 | 3/2012 | Nixon et al. | |
| 2012/0131416 A1* | 5/2012 | Dugan | G06F 11/32 |
| | | | 714/760 |
| 2012/0138671 A1* | 6/2012 | Gaede | G06Q 20/32 |
| | | | 235/375 |
| 2013/0071029 A1* | 3/2013 | Terwilliger | H04L 67/36 |
| | | | 382/183 |
| 2013/0114100 A1* | 5/2013 | Torii | G06F 11/0733 |
| | | | 358/1.14 |
| 2013/0169996 A1* | 7/2013 | McLeod | H04L 67/36 |
| | | | 358/3.28 |
| 2013/0205920 A1* | 8/2013 | Tow | G01N 35/1011 |
| | | | 73/863.01 |
| 2013/0211546 A1* | 8/2013 | Lawson | G05B 19/4185 |
| | | | 700/9 |
| 2013/0229261 A1* | 9/2013 | Gates | G02B 27/017 |
| | | | 340/10.1 |
| 2014/0107976 A1* | 4/2014 | Kallfelz | H01M 10/4285 |
| | | | 702/182 |

FOREIGN PATENT DOCUMENTS

| | | |
|---|---|---|
| EP | 1163557 B1 | 8/2003 |
| EP | 1715395 A1 | 10/2006 |
| WO | WO2008037094 A1 | 4/2008 |

OTHER PUBLICATIONS

Computer Networks, 4$^{th}$ ed., Tanenbaum, 2003, Chapter 8, 12 pages.
Modern Operating Systems, 2$^{nd}$ ed., Tanenbaum, 2001, Chapter 9, 8 pages.

\* cited by examiner

Fig. 1

(Prior art)

MACHINE MAINTENANCE USING A MACHINE CONTROLLER AND A SERVICE COMPUTER

CROSS-REFERENCE TO RELATED APPLICATIONS

This application is a continuation of and claims priority under 35 U.S.C. § 120 to PCT Application No. PCT/EP2014/000099 filed on Jan. 16, 2014, which claimed priority to German Application No. DE 10 2013 200 798.1, filed on Jan. 18, 2013. The contents of all these priority applications are hereby incorporated by reference in their entirety.

TECHNICAL FIELD

The invention relates to methods, systems, and apparatus for machine maintenance using a machine controller, and more particularly for allowing secure data transmission to a service computer.

BACKGROUND

The global orientation of today's machine manufacturers with worldwide located customers/machine operators requires being able to perform maintenance, fault diagnosis and also repairs of the machines and machine controllers not only directly on site, but more and more frequently by remote access.

Machine controllers are electronic data processing apparatuses, for example an industrial PC, on which are often installed conventional operating systems and software for intervention in the machine. Such machine controllers are exposed to comparable risks as conventional electronic data processing apparatuses, for example by malicious software such as computer viruses or worms, stealth software (e.g. "rootkits") and software allowing unauthorized access to the system (e.g. "Trojan horses"). Moreover, such machine controllers are subject to comparable maintenance requirements as conventional electronic data processing devices, e.g., the necessity of installing system updates, of evaluating and testing software functionality and of general software installations.

Besides the direct dial-in formerly commonly used for the remote maintenance from a service computer via an analog modem or an ISDN connection to the machine, modern communication technologies occur primarily through so-called virtual private networks (VPN), which allow encrypted remote access via wide area networks such as the Internet.

It is problematic that such communication links cause high and error-prone configuration effort, which themselves can already constitute the cause of fault and therefore can impede remedy of the fault by means of remote maintenance. Moreover, there is the risk that malicious software is transmitted from the service computer to the machine controller or from the machine controller to the service computer in case of maintenance in such systems.

Figure 1:
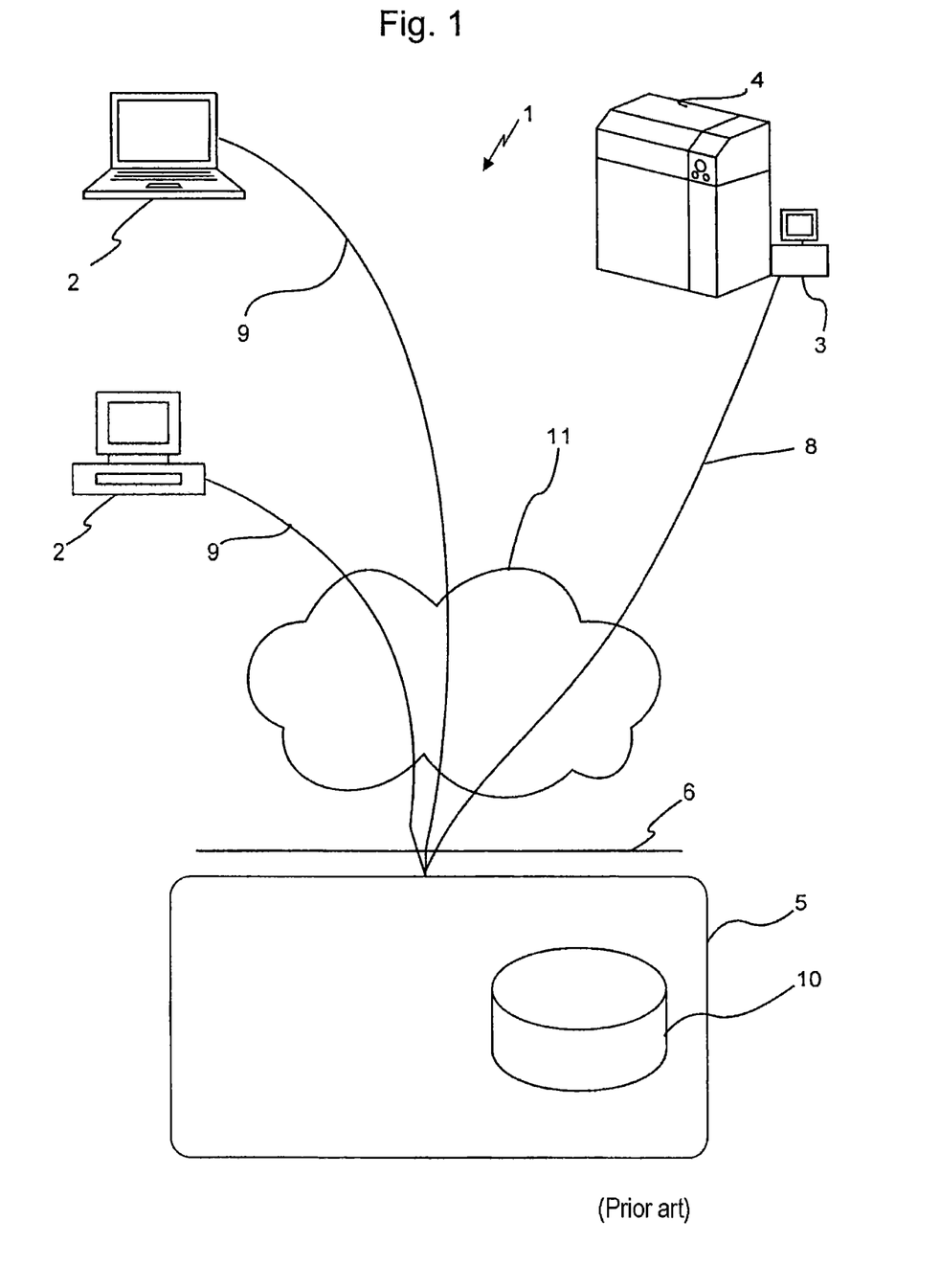
FIG. 1 shows a known communication system for remote maintenance between a service computer and a machine controller with interposition of a central computer.

EP 1 715 395 A1 discloses a system and a method for remote communication between a service computer and a machine controller. FIG. 1 shows a previously known remote communication system 1 that includes a central computer 5 protected to the outside by a firewall 6. A communication link 8 is established from the central computer 5 to a machine controller 3. A service computer 2 is not directly connected to the machine controller 3, but the connection of the service computer 2 is effected via the central computer 5, which is connected to the service computer 2 via a communication link 9. By means of remote desktop protocols such as RDP, it is accessed to the central computer 5 from the service computer 2, and to the machine controller 3 via it by means of remote desktop protocols such as RDP. If these communication links are available, maintenance works can be performed on the machine controller 3 via the service computer 2 or the central computer 5. In contrast, if the communication links are not available, a case of fault, in particular a faulty configuration of the communication link on the part of the machine controller, is not remediable or with difficultly remotely remediable in many cases.

Since even with available communication links in the above described system, exclusively desktop data such as image data, keyboard input data and mouse operation data are transmitted, capability of mutually compromising the involved systems by malicious software is reduced. The described system is especially conceived to the effect that data transmission of a file or other data between machine controller 3 and central computer 5 or service computer 2 is not required or even possible.

Therefore, it is problematic that direct data access from the central computer 5 or the service computer 2 to data of the machine controller is not possible or only possible with high effort and using additional protocols and communication links for data transmission, the use of which in turn can increase the compromising risk.

SUMMARY

One aspect of the invention features a machine controller for controlling a machine. The machine controller has a data memory configured to store maintenance data of at least one of the machine controller or the machine in an electronically processable manner. The machine controller also includes an imaging apparatus, e.g., an imaging processing unit or an imaging processor, configured to at least partially read out the maintenance data from the data memory and generate image information of a graphical representation. The graphical representation includes a first presentation area representing a first section of the maintenance data in a form designed for machine readability. The machine controller can include a display apparatus, e.g., a monitor, configured to display the graphical representation based on the image information. The machine controller can also include a data transmission interface configured to indirectly or directly transmit the image information to a service computer to display or evaluate the graphical representation on the service computer. The machine controller allows secure data transmission with the service computer.

The machine controller allows representing information, e.g., on a screen, for displaying operating data of the machine controller in an area in machine-readable form, for example, as a bar code, Quick Response (QR) code or data matrix code.

If a communication link is available, this screen output can be transmitted to the service computer by means of a remote desktop protocol. The service computer is able to interpret the machine-readable information and electronically further process the extracted data, although only image information is transmitted to the service computer. Thus mutual compromise of machine controller and service computer by malicious software is reduced. Moreover, if a communication link is faulty, the screen of the machine controller can be photographed by a user and be transmitted to the personnel for remote maintenance of the machine controller via alternative communication channels and there be evaluated in machine assisted manner.

If the imaging apparatus is set up such that the image information of the graphical representation is generated such that the graphical representation includes a second representation area, which includes a second section of the maintenance data in a form readable by a user, the remote maintenance personnel can both capture the machine-readable error messages on the screen and electronically further process the digital information with functioning communication link.

Herein, the graphical representation does not necessarily have to be a single image with static machine-readable information, but can be an image sequence, in which the first representation area and/or the second representation area varies in the image sequence to transmit the first partial information as a data stream. This has the advantage that via the consecutively varying first representation area with machine-readable data, a data stream and thus higher amount of data can be transmitted and processed. This also allows applications such as a liveticker of arbitrary information (e.g., production plan status, current error message list, etc.) of the machine in the teleservice.

The first section of the maintenance data and the second section of the maintenance data can be disjunct. However, the first section of the maintenance data and the second section of the maintenance data can also partially include the same maintenance data. Thereby, it is possible to also transmit such maintenance data in the first representation area besides maintenance data exclusively relevant to electronic further processing, which additionally or exclusively is relevant to maintenance actions by maintenance personnel and also is represented in the second representation area.

In the graphical representation, the first representation area can be disposed spatially separated from the second representation area. This allows simple automated capture of the machine-readable data from the first representation area and good readability of the data capturable by a user in the second representation area.

The first representation area and the second representation area can partially or even completely overlap. This is in particular advantageous if little or too little space for a separate representation of the first representation area is present in the graphical representation. Herein, it is in particular possible to overlay the first representation area by the second representation area by means of steganographic methods such that the first representation area remains capturable and evaluable by machine, but is not or hardly perceived by a user. The first representation can for example be a bar code, a QR code, a data matrix code or the like.

Another aspect of the invention features a machine controller maintenance system which has at least one of the above described machine controllers and a service computer. The service computer is set up to be connected to the machine controller via a first communication link preferably by means of a remote desktop protocol such that the image information is transmitted to the service computer. The service computer has a data extraction apparatus configured to capture the first representation and to read out the first section of the maintenance data therefrom.

If the service computer has a service computer display apparatus, it is possible to represent the first representation area and in particular the second representation area such that the first representation area and/or the second representation area can be captured by the remote maintenance personnel.

If the machine maintenance system further has a central computer, which is set up to be connected to the machine controller via the first communication link and to the service computer via a second communication link, preferably by means of a remote desktop protocol such that the image information is transmitted from the machine controller via the central computer to the service computer, it is not required to carry out the maintenance works from a single central computer or maintenance computer, which allows simultaneous maintenance works with numerous remote maintenance personnel and multiple service PCs.

Another aspect of the invention features a machine controller maintenance method for maintaining a machine controller intended for controlling a machine. The method includes storing maintenance data of at least one of the machine controller or the machine in electronically processable form, generating image information of a graphical representation that includes a first representation area representing a first section of the maintenance data in a form designed for machine readability, and displaying, on a display unit of the machine controller, the graphical representation based on the image information to an operator or indirectly or directly transmitting the image information to a service computer.

Herein, the generation of the image information can be effected such that the graphical representation includes a second representation area, which includes a second section of the maintenance data in a form readable by a user.

Further, the method can include capturing the first representation by the service computer and reading out the first maintenance data from the first representation by the service computer.

As used herein, the term "machine" or "machine tool" presents all of the processing plants, e.g., for laser processing, punching, or bending, and appliances such as laser beam sources, plasma or induction generators.

Other advantages and advantageous embodiments of the subject-matter of the invention will be appreciated from the description, the claims and the drawings. The features mentioned above and those set out below may also be used individually per se or together in any combination. The embodiments shown and described are not intended to be understood to be a conclusive listing but are instead of exemplary character for describing the invention. The Figures of the drawings show the subject-matter according to the invention in a highly schematic manner and are not intended to be understood to be to scale.

DETAILED DESCRIPTION

Figure 2:
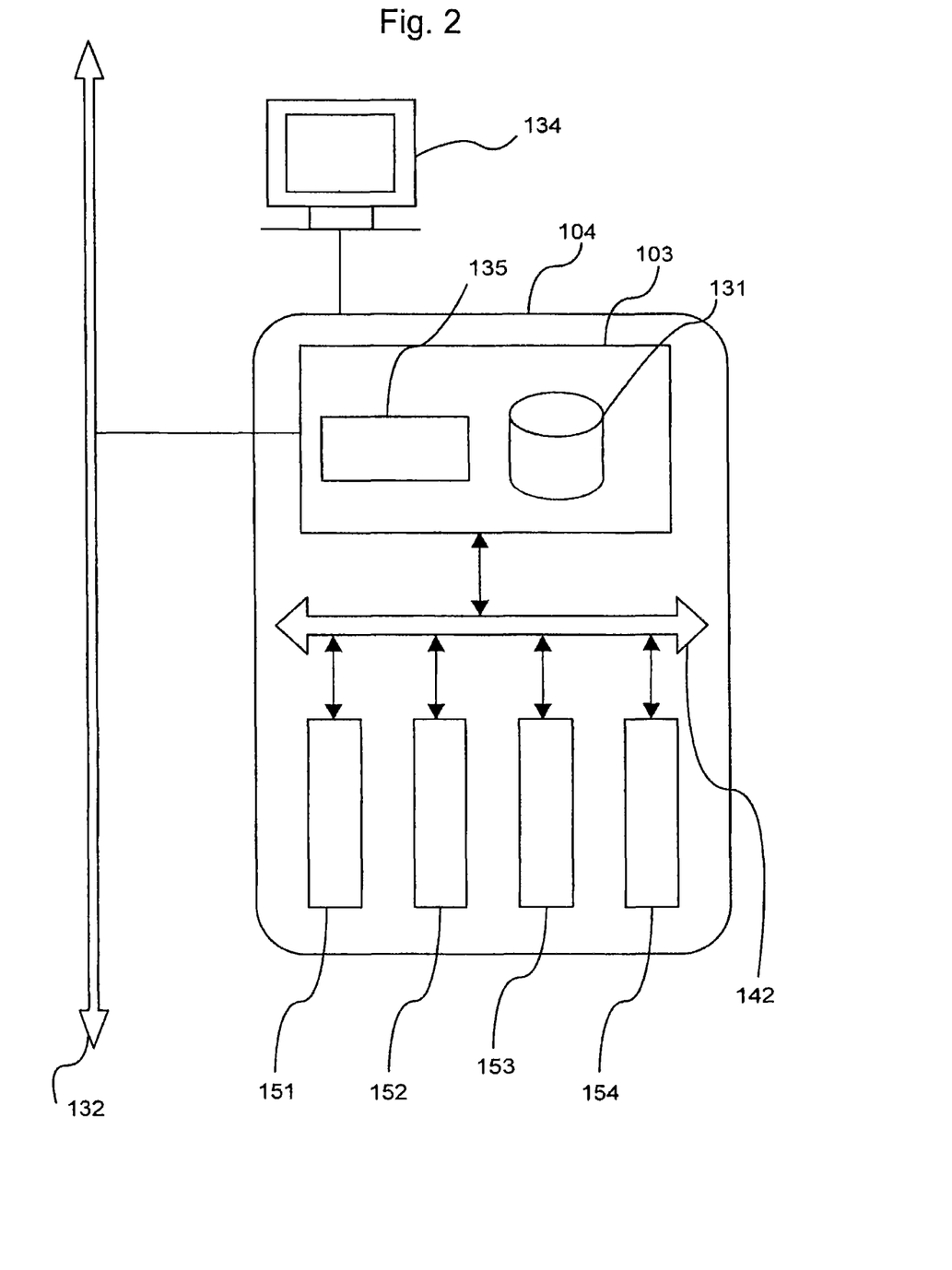
FIG. 2 shows an example machine controller according to a first embodiment.

In FIG. 2, a machine controller 103 of a machine 104 is illustrated in a first embodiment. The machine 104 is a machine located at a machine operator or processing plant, e.g., for laser processing, punching, or bending, and appliances such as laser beam sources, plasma or induction generators, or any other machine for manipulation of a workpiece.

The machine 104 has a machine controller 103 and an internal machine communication network 142, via which data is transmitted and control operations between the machine controller 103 and a numerical control (NC) or a memory-programmable control (PLC) 151 or further technical controllers 152, 153 and 154 are handled.

The machine controller 103 is an electronic data processing apparatus located at a machine operator, for example an industrial PC, via which the machine 104 can be programmed, operated and maintained, and which monitors the operation of the machine. The machine controller 103 is connected to a communication network 132, for example a communication network operated based on Ethernet of the machine operator for intra-corporate data transmission and processing. The machine controller 103 has a data memory 131, which can be configured as a magnetic hard disk drive (HDD) or as a semiconductor storage drive (SSD). Different data is stored on the data memory 131, such as application data or maintenance data. Herein, maintenance data includes information about the current or past operating state of the machine controller or the machine. For example, this can be current configuration parameters of the machine controller 103 or the machine 104, current states of the machine controller 103 or the machine 104 or former configuration data or operating states of the machine controller 103 or the machine 104, for example identification and location information or log files about working operations or error messages. The machine controller 103 further has a display apparatus 134, for example a monitor, and input devices, for example mouse and keyboard, via which the machine controller 103 can be operated by a user.

Further, the machine controller 103 with its resources as its main processor and working memory has an imaging apparatus 135, e.g., an imaging processing unit or an imaging processor, via which the display presented on the display apparatus 134 can be generated based on the maintenance data among other things.

Figure 3:
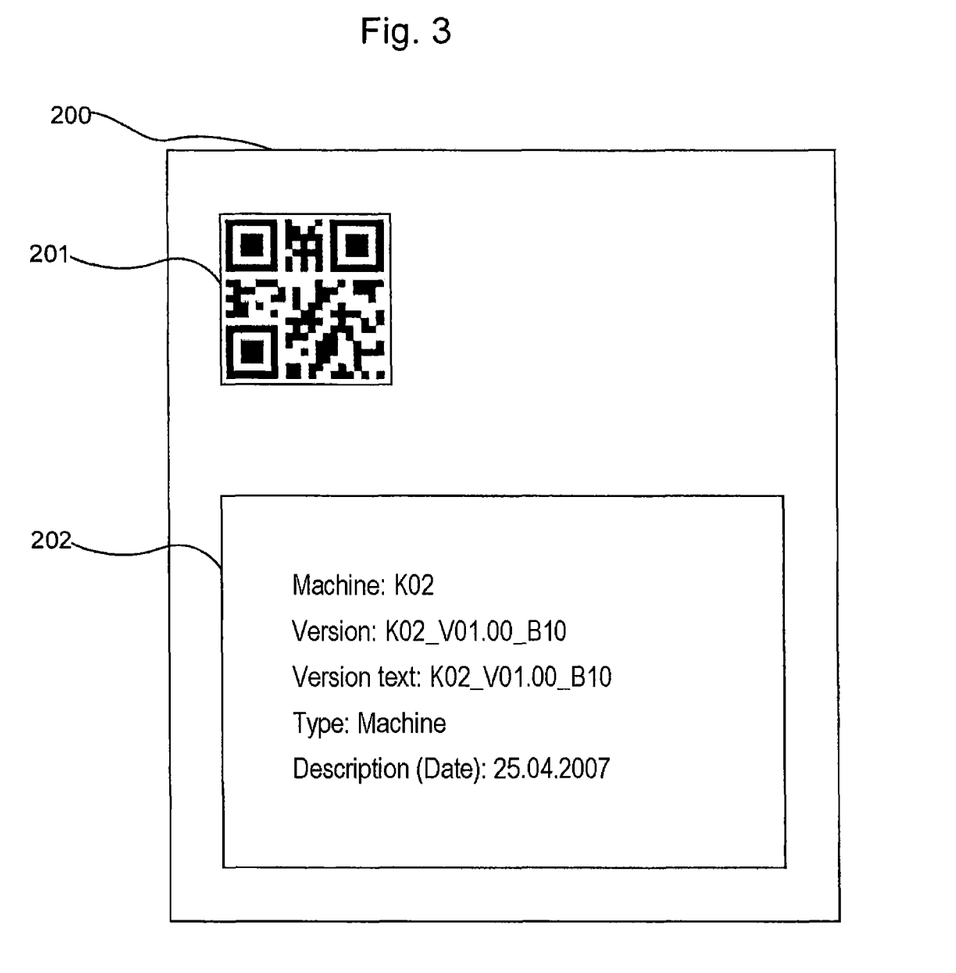
FIG. 3 shows an example display of a graphical representation of the first embodiment of FIG. 2.

FIG. 3 shows such a display of the display apparatus 134. In case of maintenance, a display in the form of a graphical representation 200 is generated by the imaging apparatus 135, and a first section of the maintenance data stored in the data memory 131 in machine-readable form, for example by means of a QR code, is graphically represented in a first representation area 201.

In a second representation area 202, a second section of the maintenance data is represented in written form such that the information can be captured by a user. Herein, it is not necessarily required that the second representation area 202 is present. For example, to maximize the represented amount of data of the first section of the maintenance data in the first representation area 201, it is possible to increase the first representation area at the expense of the second representation area 202.

Further, it is possible to maximize the second representation area 202 for maximizing the user-readable information and to overlay the first representation area 201 for example in semi-transparent manner by it such that besides the machine-readable information more user-readable information can be displayed. In particular, in the latter case, it is possible to overlay the first representation area by the second representation area by means of graphical steganographic methods, e.g., an LBS (Least Significant Bits) method, in which the least significant bit of the color values of the second representation area is used for representing the first representation area and thus is not or hardly perceivable by the user, but can be electronically utilized.

During the operation of the machine controller 103 and the machine 104, maintenance data is stored on the data memory 131. In case of maintenance, the machine controller 103 generates a display of the display apparatus 134 in the form of the graphical representation 200 by the imaging device 135, which includes the first representation area 201 representing a first section of the maintenance data in a form designed for machine readability, e.g., a bar code, a QR code, a data matrix code or any other graphical encoding method. Optionally, the graphical representation includes the second representation area 202, which represents the second section of the maintenance data in written form.

The graphical representation 200 is then represented on the display apparatus 134 based on the image information generated by the imaging apparatus 135. The graphical representation 200 can be photographed from the display apparatus 134, e.g., by means of a conventional camera, and transmitted to the remote maintenance personnel on any way, who evaluates the information from the first representation area and/or the second representation area in case of fault or maintenance.

Figure 4:
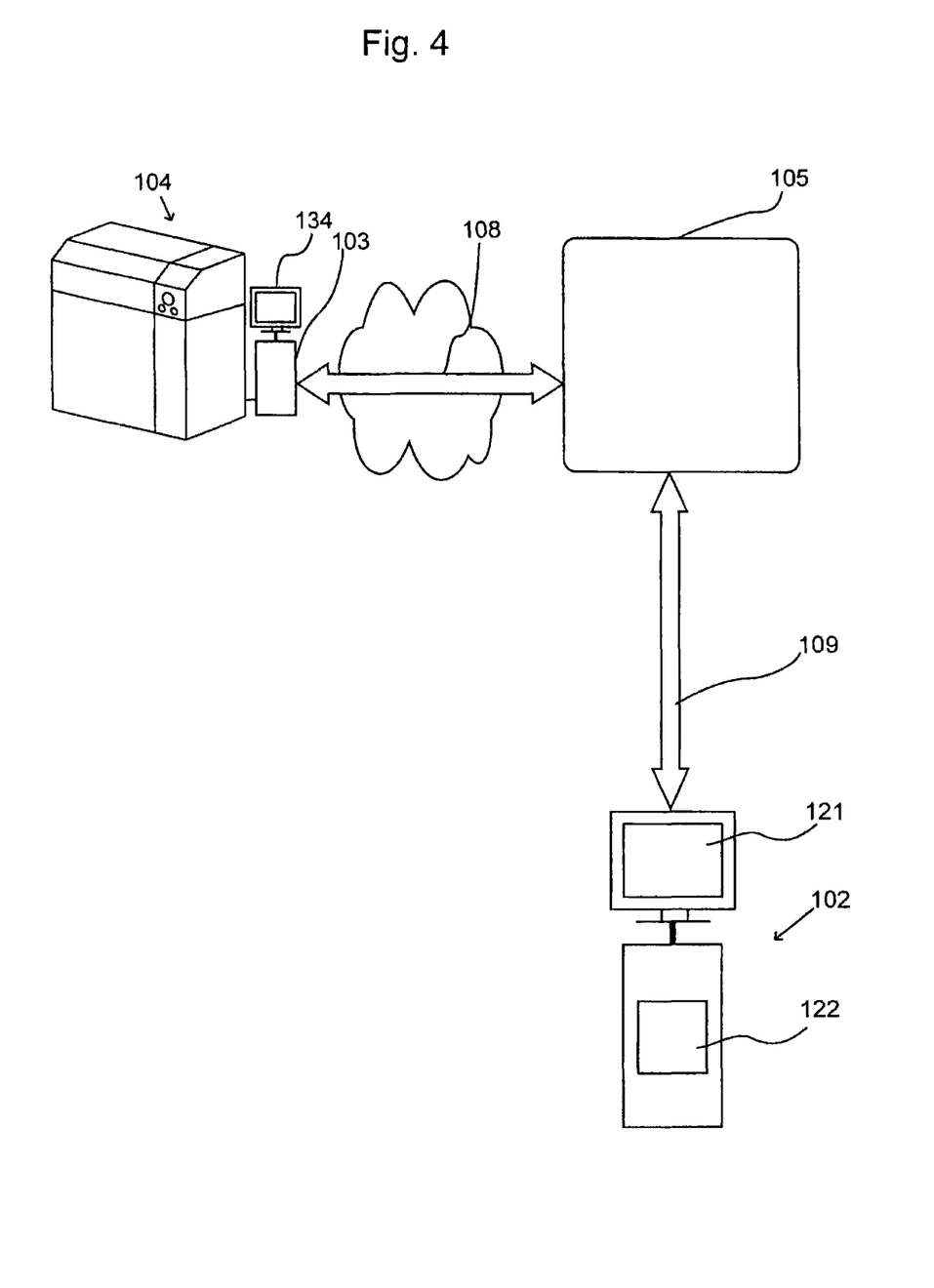
FIG. 4 shows an example machine controller remote maintenance system according to a second embodiment.

FIG. 4 shows a second embodiment of the invention. The second embodiment has the machine 104 and the machine controller 103 of the machine operator from the first embodiment. The machine controller 103 differs from the first embodiment in that the machine controller 103 can be connected via a data transmission interface by means of a first communication link 108. Further, an operating system is installed on the machine controller 103, which allows by means of the service "terminal services" and RDP that other computers can access to desktop applications and data of the machine controller 103 via the remote desktop protocol.

In this embodiment, the remote desktop protocol and the service "terminal services" are used for the data transmission of the image information, but this is not required to the invention. Instead, other protocols and services can also be used, which provide the same or comparable functionality such as for example the "independent computing architecture" (ICA), "remote frame buffer" (RFB) or others. Protocols as these allowing the access to graphical use surfaces of operating systems or applications on remote computers are referred to as remote desktop protocols in this specification. Remote desktop protocols are substantially characterized in that they transmit pixel information of an operating system or of an application on a remote computer in one direction to a user computer and input information such as mouse movements and keyboard inputs from the user computer in an opposite direction to the remote computer.

The system of the second embodiment has a central computer 105 located at the machine manufacturer. It is an electronic data processing apparatus, which implements a telepresence system. On the central computer 105, for example, a "TRUMPF Internet telepresence portal" is installed. More exactly, an operating system is installed, which allows by means of the service "terminal services" and RDP that other computers can access to desktop applications and data of the central computer 105 via the remote desktop protocol. Further, application software is installed on the central computer 105, which is able to access to the content of desktops or applications of remote computers by means of remote desktop protocol (RDP) and allows the operation of the remote computers.

The central computer 105 is connected to the machine controller 103 via the first communication link 108 such that data can be transmitted between the machine controller 103 and the central computer 105.

The central computer 105 can further have a computer display apparatus, for example a monitor, and input devices, for example mouse and keyboard, via which the central computer 105 can be operated and image information can be displayed to a user. However, this is not required, and the central computer 105 does not have the computer display apparatus and the input devices in this embodiment.

The system of the second embodiment further has a service computer 102, which serves for the maintenance personnel of the machine manufacturer performing maintenance works on the machine controller 103 by means of remote maintenance. The service computer 102 has a service computer display apparatus 121, for example a monitor, and input devices, for example mouse and keyboard, via which the service computer 102 can be operated and image information can be displayed to a user.

The service computer 102 is connected to the central computer 105 via a second communication link 109, for example via a communication network of the machine manufacturer operated based on Ethernet for intra-corporate data transmission and processing, such that data can be transmitted between the machine controller 103 and the central computer 105.

Application software is installed on the service computer 102, which can represent the content of desktops of remote computers by means of remote desktop protocol (RDP) in the embodiment, alternatively also via other remote desktop protocols, and allows the operation of the remote computers.

Further, the service computer 102 with its resources as its main processor and working memory has a data extraction apparatus 122, which is set up to capture the first representation area 201 from the image information of the graphical representation 200 and to read out the first section of the maintenance data therefrom. Herein, by the data extraction apparatus 122, the machine-readable code of the first representation area 201 is captured by conventional image processing methods, evaluated and the extracted data is stored. Alternatively, the data extraction apparatus 122 can also be embedded in the central computer 105.

In case of maintenance, now, by the machine controller 103, as described above, the image information of the graphical representation 200 is generated by the imaging apparatus 135 based on the previously stored maintenance data.

The image information is now transmitted to the central computer 105 either additionally or alternatively to the representation on the display apparatus 134 via the data transmission interface and the first communication link 108 by means of RDP. Hereto, the first communication link 108 is established between the central computer 105 and the machine controller 103. In the embodiment, this link is provided via the Internet. For securing the first communication link 108, the data traffic is transmitted in encrypted manner via the first communication link 108 and thus a VPN tunnel is realized.

The image information is further transmitted via the second communication link 109 by means of RPD to the service computer 102. Hereto, the second communication link 109 is established between the central computer 105 and the service computer 102. In the embodiment, this link is provided via a local data network of the machine operator.

Figure 5:
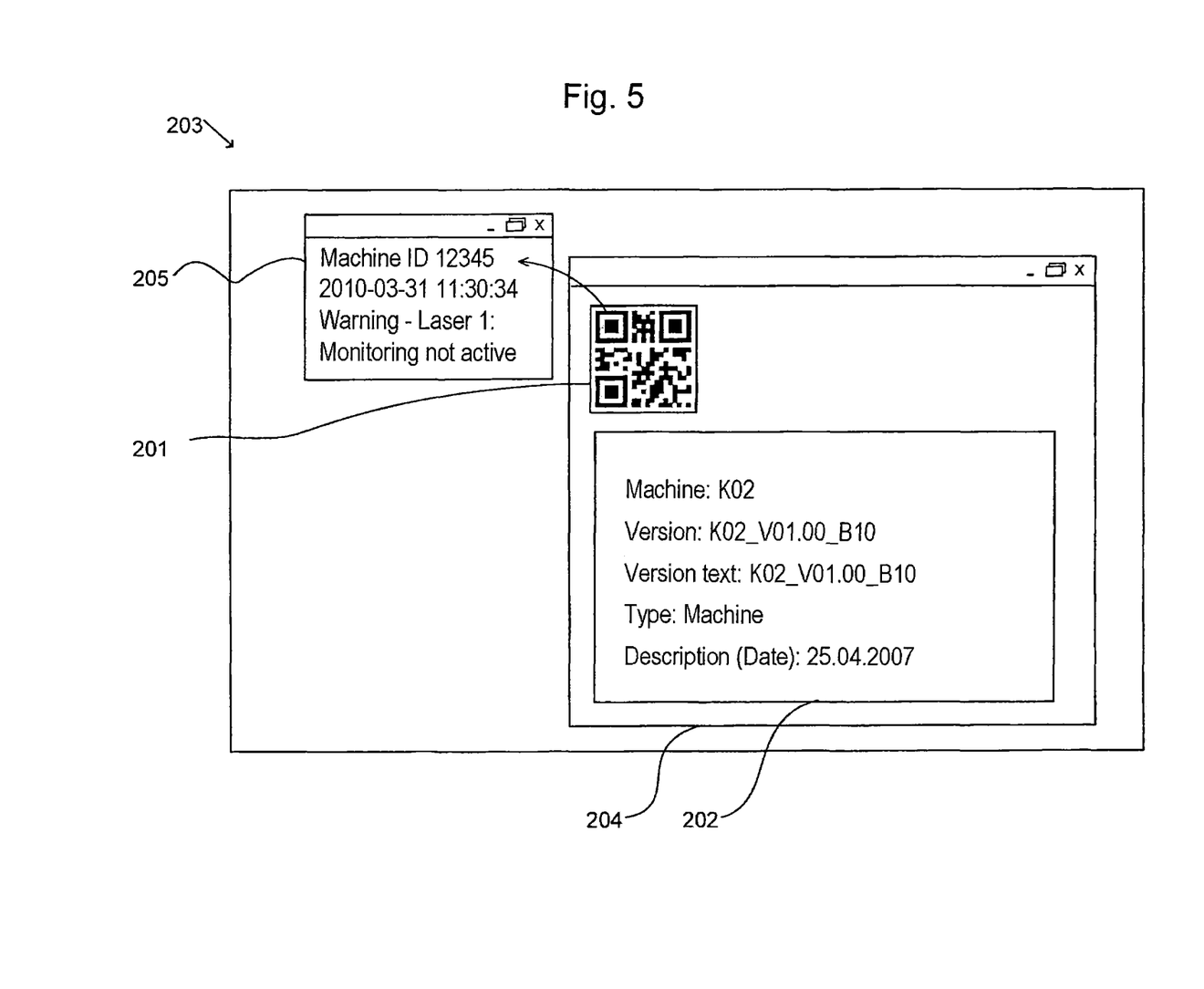
FIG. 5 shows an example representation of a service computer display from the second embodiment of FIG. 4.

The graphical representation is displayed on the service computer display apparatus 121 in the display 203 shown in FIG. 5 in a machine controller display area 204 based on the image information. By the data extraction apparatus 122, the first representation area 201 is determined in conventional form, for example by recognizing distinctive corner areas of the QR code, the machine-readable graphical code is evaluated and read out in conventional form and the first section of the maintenance data extracted thereby is stored. Moreover, the second section of the maintenance data or parts thereof is displayed on the display 203 for control by a user in a data evaluation display area 205. Based on the automatically captured first section of the maintenance data, further method steps can be performed by the service computer 102 in automated manner as the initiation of automatic test methods based on type and location information of the machine contained in the first section of the maintenance data, etc.

The shown and described embodiments are not to be understood as conclusive enumeration, but rather have an exemplary character for describing the invention.

Thus, in the first embodiment, the maintenance data is stored on a permanent storage medium. However, it is equally possible to work with maintenance data, which is stored in a volatile storage medium such as a volatile working memory with random access ("random access memory", RAM).

Further, in the second embodiment, the image information is transmitted by means of RDP. However, besides further remote desktop protocols, each protocol is here suitable, by which image information can be transmitted. For example, the first section of the maintenance data can also be transmitted in a non-illustrated area of the signal of an analog video transmission, in so-called blanking intervals.

In the second embodiment, the service computer has the data extraction apparatus 122. It is also possible that the central computer instead includes the data extraction apparatus, reads out the first section of the maintenance data from the first representation area 201 and further processes it itself or transmits it to the service computer 102 for further processing by means of a suitable protocol.

In the second embodiment, the service computer 102 is connected to the central computer 105 via a local data network of the machine manufacturer. However, the service computer 102 can also in turn be connected to the central computer 105 via wide area networks such as the Internet, preferably by means of a VPN tunnel.

A number of embodiments of the invention have been described. Nevertheless, it will be understood that various modifications may be made without departing from the spirit and scope of the invention. Accordingly, other embodiments are within the scope of the following claims.

What is claimed is:

1. A machine controller comprising:
   a data memory configured to store maintenance data of at least one of the machine controller or an industrial machine tool, the stored maintenance data being electronically processable, wherein the machine controller is configured to communicate with a numerical control (NC), a memory-programmable control (PLC), or one or more further technical controllers of the industrial machine tool via an internal machine communication bus network of the industrial machine tool;
   an imaging processing unit configured to at least partially read out the maintenance data from the data memory and generate image information of a graphical representation that includes a first representation area representing a first section of the maintenance data as a machine readable image that encodes the maintenance data, wherein the machine readable image is graphically hidden from human view within a second section of the maintenance data that includes user-readable information;
a display unit configured to display the graphical representation based on the image information on a screen; and
a data transmission interface configured to transmit the image information by transmitting a copy of the graphic representation displayed on the screen via a transmission protocol configured to exclusively transmit the image information from the machine controller,
wherein the machine controller is in electronic communication with, but separate from, the industrial machine tool and the industrial machine tool is configured to perform manipulations of one or more work pieces.

2. The machine controller of claim 1, wherein the first section of the maintenance data and the second section of the maintenance data at least partially include a same portion of the maintenance data.

3. The machine controller of claim 1, wherein the first section of the maintenance data and the second section of the maintenance data at least partially overlap in the graphical representation.

4. The machine controller of claim 1, wherein the imaging processing unit is configured to generate the image information of the graphical representation using a least significant bit steganography process.

5. The machine controller of claim 4, wherein the least significant bit steganography process comprises representing the first section of the maintenance data within least significant bits of color values associated with the second section of the maintenance data.

6. The machine controller of claim 1, wherein the transmission protocol comprises a remote desktop protocol (RDP).

7. A machine controller maintenance system comprising:
at least one machine controller for controlling a machine, the machine controller configured to communicate with a numerical control (NC), a memory-programmable control (PLC), or one or more further technical controllers of the machine via an internal machine communication bus network of the machine, the machine controller comprising:
a data memory configured to store maintenance data of at least one of the machine controller or the machine, the stored maintenance data being electronically processable;
an imaging processing unit configured to at least partially read out the maintenance data from the data memory and to generate image information of a graphical representation that includes a first representation area representing a first section of the maintenance data as a machine readable image that encodes the maintenance data;
a display unit configured to display the graphical representation based on the image information on a screen; and
a data transmission interface configured to transmit the image information by transmitting a copy of the graphic representation displayed on the screen via a transmission protocol configured to exclusively transmit the image information from the machine controller;
a service computer coupled to the data transmission interface to receive the image information by receiving the copy of the graphic representation displayed on the screen via the transmission protocol and configured to:
capture the first representation area based on the image information and read out the first section of the maintenance data from the first representation area, and
automatically initiate performance of automatic tests on the machine based on type and location information of the machine contained in the read out first section of the maintenance data; and
a central computer connected between the machine controller and the service computer, the central computer connected to the machine controller via a first communication link and connected to the service computer via a second, different, communication link, the first communication link comprising a wide area network and the second communication link comprising a local data network of a manufacturer of the machine.

8. The machine controller maintenance system of claim 7, wherein the service computer comprises a display unit configured to display the graphical representation of the image information.

9. The machine controller maintenance system of claim 7, wherein the graphical representation comprises a second representation area representing a second section of the maintenance data and including user-readable information in written form.

10. The machine controller maintenance system of claim 9, wherein the service computer is configured to display the second section of the maintenance data.

11. The machine controller maintenance system of claim 7, wherein the image information is transmitted from the machine controller, via the first communication link, to the central computer and from the central computer, via the second communication link, to the service computer.

12. The machine controller maintenance system of claim 7, wherein the transmission protocol comprises a remote desktop protocol (RDP).

13. The machine controller maintenance system of claim 7, wherein the machine is an industrial machine tool that is configured to perform manipulations of one or more work pieces.

14. The machine controller maintenance system of claim 7, wherein the machine readable image that encodes the maintenance data is graphically hidden from human view within a second section of the maintenance data that includes user-readable information.

15. The machine controller maintenance system of claim 14, wherein the imaging processing unit is configured to generate the image information of the graphical representation using a least significant bit steganography process, and
wherein using the least significant bit steganography process comprises representing the first section of the maintenance data within least significant bits of color values associated with the second section of the maintenance data.

16. A method of maintaining a machine controller for controlling a machine, the method comprising:
storing maintenance data of at least one of the machine controller or the machine, the stored maintenance data being electronically processable, wherein the machine controller is configured to communicate with a numerical control (NC), a memory-programmable control (PLC), or one or more further technical controllers of the machine via an internal machine communication bus network of the machine;
generating image information of a graphical representation that includes a first representation area representing a first section of the maintenance data as a machine readable image that encodes the maintenance data, wherein the machine readable image is graphically hidden from human view within a second section of the maintenance data that includes user-readable information;

displaying, by a display unit of the machine controller, the graphical representation based on the image information on a screen to an operator;

transmitting, by the machine controller, a copy of the graphical representation displayed on the screen via a transmission protocol configured to exclusively transmit the image information from the machine controller to a central computer via a first communication link that comprises a wide area network; and transmitting, by the central computer, the copy of the graphical representation to a service computer via a second, different, communication link that comprises a local data network of a manufacturer of the machine.

17. The method of claim 16, wherein displaying the graphic representation comprises at least partially overlapping the first section of the maintenance data and the second section of the maintenance data in the graphical representation.

18. The method of claim 16, further comprising:
capturing, by using the service computer, the first representation area; and
reading out, by using the service computer, the first section of the maintenance data from the first representation area.

19. The method of claim 18, further comprising:
automatically displaying the first section of the maintenance data on a service computer display unit of the service computer.

20. The method of claim 16, wherein the machine is an industrial machine tool that is configured to perform manipulations of one or more work pieces.

21. The method of claim 16, wherein the transmission protocol comprises a remote desktop protocol (RDP).

22. The method of claim 16, wherein generating the image information of the graphical representation comprise generating the image information using a least significant bit steganography process.

23. The method of claim 22, wherein using the least significant bit steganography process comprises representing the first section of the maintenance data within least significant bits of color values associated with the second section of the maintenance data.

* * * * *